April 11, 1961 N. C. DE TROIJE 2,979,261
DEVICE FOR ADDING TWO NUMBERS
Filed Sept. 16, 1957
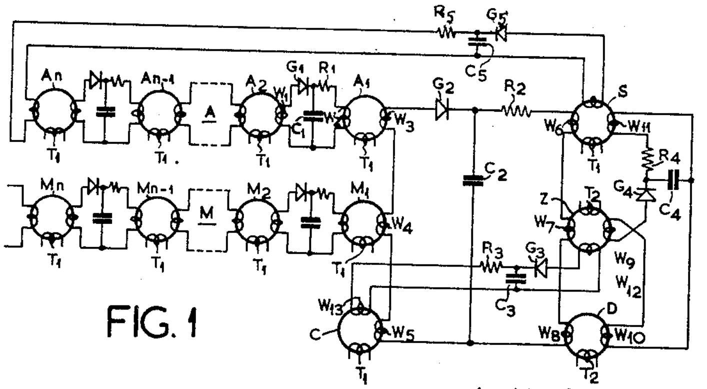
FIG. 1
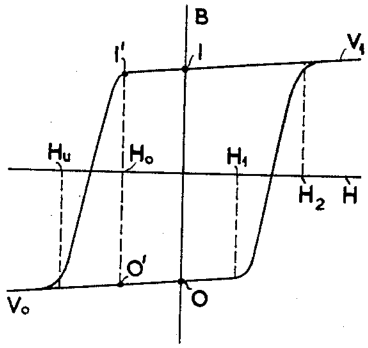
FIG. 2
| | A | M | C | Z | S1 | S |
|---|---|---|---|---|---|---|
| F1 | 0 | 0 | 0 | 0 | 0 | 0 |
| F2 | 1 | 0 | 0 | 0 | 1 | 1 |
| F3 | 0 | 1 | 0 | 0 | 1 | 1 |
| F4 | 0 | 0 | 1 | 0 | 1 | 1 |
| F5 | 0 | 1 | 1 | 1 | 1 | 0 |
| F6 | 1 | 0 | 1 | 1 | 1 | 0 |
| F7 | 1 | 1 | 0 | 1 | 1 | 0 |
| F8 | 1 | 1 | 1 | 1 | 1 | 1 |
FIG. 3
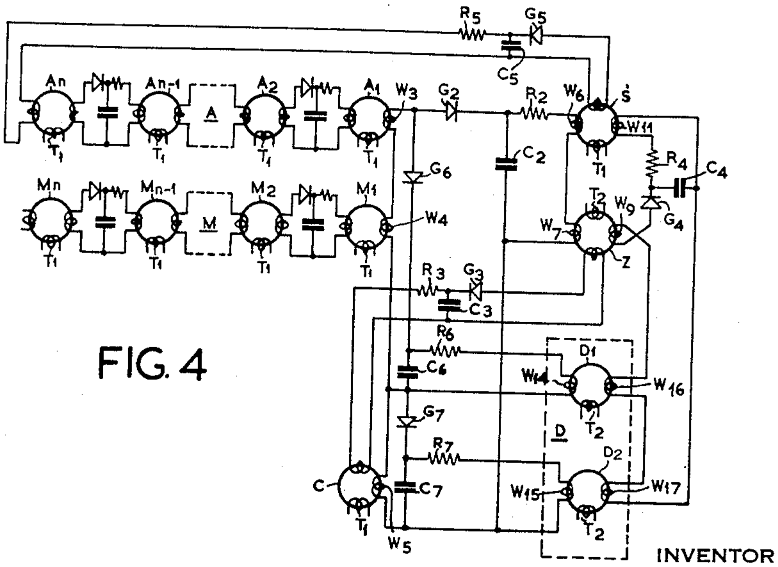
FIG. 4
INVENTOR
NICOLAAS CORNELIS DE TROIJE
BY
Frank R. Jeffari
AGENT 2,979,261

DEVICE FOR ADDING TWO NUMBERS

Nicolaas Cornelis de Troije, Eindhoven, Netherlands, assignor to North American Philips Company, Inc., New York, N.Y., a corporation of Delaware Filed Sept. 16, 1957, Ser. No. 683,989

Claims priority, application Netherlands Oct. 31, 1956

2 Claims. (Cl. 235—176)

This invention relates to devices for adding two binary numbers, in which the figures of the sum are produced in sequential stages by adding the figures of the numbers registered in registers and corresponding to the same binal and the carry produced in the preceding stage.

Such an adding device is in certain cases referred to as a "series-adder."

The device according to the invention comprises a certain number of ferro-magnetic memory elements which may be brought into a condition of remanent magnetization of one polarity or the other for registering the binary figures 1 and 0. The figures to be added are registered at the beginning of a stage in registers which may be constituted by such ferromagnetic memory elements. The registers are inductively coupled with a first magnetic memory element for producing the sum of a given binal, with a second magnetic memory element for producing the new carry and with a memory device. Under the control of a first reading pulse, as a function of the three figures to be added, polarizing pulses are supplied to the first and the second memory elements and the memory device. If at least one of the figures is 1, the first memory element is brought into the condition 1 and if at least two of the figures are 1, the second memory element is also brought into the condition 1, and if all three figures are 1, the memory device is also brought into a condition which is characteristic thereof. The second memory element and the memory device are also inductively coupled with the first memory element in a manner such that under the control of a second reading pulse, a pulse polarizing in the zero condition is transferred from the second memory element to the first, if the second memory element occupies the condition 1. The action of this pulse is eliminated, however, by a pulse transferred from the memory device to the first memory element, if the memory device occupies the condition 1.

In order that the invention may be readily carried into effect, it will now be described more fully, by way of example, with reference to the accompanying drawing, in which:

Figs. 1 and 4 show two embodiments;

Fig. 2 shows a magnetisation curve, and

Fig. 3 relates to a table.

Fig. 1 shows part of an electronic computer for adding, by means of a series adder, two numbers which are registered in sliding registers A and M. The sliding registers A and M are built up in known manner and each comprises a number of bivalent magnetic memory elements A1, A2 . . . A$n$—1, A$n$ and M1, M2 . . . M$n$—1, M$n$, each magnetic element having a closed ferro-magnetic circuit of material exhibiting a substantially parallelogram-like hysteresis loop such as shown in Fig. 2. For registering the binary figures 0 and 1, the elements may be brought into conditions of remanent magnetism 0 and 1, as shown in Fig. 2. At the beginning of the addition, the two numbers to be added are registered by the registers A and M in a manner such that the figures of lowest order are registered by the memory elements A1 and M1, the figures of next-higher order by the elements A2 and M2, etc. The figures of the sum, ultimately registered by the accumulator register A, are produced in a plurality of sequential stages, the figures of a given binal and the carry produced in the preceding stage and stored by the memory element C being added in each stage. The memory element S serves to produce the sum of a given binal and the memory element Z serves to produce the new carry. The object of the memory element D will appear hereinafter.

The memory elements of the registers A and M are each inductively coupled with the memory element of next-lower order by means of a loop coupling. Thus, for example, winding W1 on the memory core A2 is coupled via a rectifier G1 and a resistor R1 to winding W2 on the core A1, a capacitor C1 being included between the common point of rectifier G1 and resistor R1 and the common point of the windings W1 and W2. Arranged on the cores of the registers A and M and the cores S and C are also reading-out windings T1, to which reading pulses are periodically supplied in known manner (not shown). A reading pulse brings the magnetic field of a core to a value H$u$, corresponding to a condition of magnetic saturation V0, as shown in Fig. 2, so that after the end of a reading pulse the core occupies the condition of remanent magnetization 0. If the core, prior to the pulse, occupied the condition 0, this condition is maintained, but if the core occupied the condition 1, the condition of magnetization varies as a result of the reading pulse, so that a reaction pulse is induced in the winding coupling the core to the subsequent core. If, for example, the core A2 occupies the condition 1, a reading pulse occurring at the winding T1 of this core causes the winding W1 to transfer a current pulse to the capacitor C1 via the rectifier G1. Thus, after a reading pulse, all cores of the registers A and M occupy the condition 0, whilst the capacitors C1, which correspond to the cores in which the figure 1 was registered prior to the pulse, are charged. The charged capacitors discharge via the resistor R1 and the winding W2 on the subsequent core of lower order, so that the magnetic field in the last-mentioned core is brought to the value H2, as shown in Fig. 2, and this core passes to the condition 1. The rectifiers G1 prevent the capacitors C1 from discharging via the windings W1. A reading pulse thus causes the numbers registered in the registers A and M to be shifted one place to the right, so that the various binal figures of the numbers successively appear in the elements A1 and M1. The cores A1, M1 and C are similarly interconnected by means of a common loop coupling to the cores S, Z and D. The windings W3, W4 and W5 on the cores A1, M1 and C are connected in series via rectifier G2 to the capacitor C2, which capacitor is connected via resistor R2 to windings W6, W7 and W8 on the cores S, Z and D.

When the figure 0 is registered in the cores A1, M1 and C, the capacitor C2 is uncharged after a reading pulse at the windings T1 on the cores A1, M1 and C. When the figure 1 is registered in one of the cores and the figure 0 in the other cores, the capacitor C2, after a reading pulse, is charged via rectifier G2 to a given voltage. When two of the cores register the figure 1 and the third core the figure 0, a reading pulse causes the capacitor C2 to be charged to a voltage twice that in the preceding case and, if all three cores register the figure 1, the voltage of the capacitor is thrice as large. The numbers of turns of the windings W6, W7 and W8 on the cores S, Z and D are in a proportion of 6:3:2 and are chosen such that, if a 1 is registered in one of the cores A1, M1 and C, only core S passes to the condition 1 when a reading pulse occurs. As a result of the discharging current of capacitor C2, the magnetic field in the core S then assumes a value H2 as shown in Fig. 2, so that this core is controlled into its saturation range V1 and assumes the condition of remanent magnetization 1. However, the field in the core Z assumes only half of this value H1, since the number of turns of the winding W7 is half that of the winding W6. The value H1 is not sufficient to bring the core Z into the condition 1. The field in the core D reaches a value which is only one-third of H2, so that this core also remains in the condition 0. If two of the cores A1, M1 and C register a 1, both the cores S and Z pass to the condition 1, the voltage of capacitor C2 now being twice that in the preceding case, so that the field in the core Z also assumes the value H2. However, the field in the core D is still not sufficient to change-over magnetically this core also. If all cores A1, M1 and C register a 1, all cores S, Z and D pass to the condition 1.

The table of Fig. 3 shows the eight different cases F1–F8 which may occur when three figures are added. The figures which may be registered in the memory elements A1, M1 and C, are specified in the columns A, M and C. The sum of the three figures is given in the column S and the carry produced in the addition is indicated in column Z. Column S1 indicates the condition which the core S assumes when a reading pulse is supplied to the windings T1 on the cores A1, M1 and C. As appears from the table, this condition is not equal for all cases to the condition which corresponds to the actual sum of the figures such as shown in column S. If the three figures to be added are 0, as corresponds to the first line F1 of Fig. 3, no reaction pulse occurs upon reading-out the cores A1, M1 and C and the cores S, Z and D remain in the condition 0. If one of the figures is 1, as corresponds to the cases F2, F3 and F4 of Fig. 3, the core S passes to the condition 1, as previously mentioned, and the cores Z and D remain in the condition 0, so that the cores S and Z register the actual sum and the carry, respectively. If two of the figures are 1 as corresponds to the cores F5, F6 and F7 of Fig. 3, the core Z passes to the condition 1, which means that the carry to be taken into account in the addition of the next binal is 1. The sum of the figures would now have to be 0. However, the core S also passes to the condition 1, as shown in column S1 of Fig. 3, which does not correspond to the value of the sum, which in those cases would have to be 0. This error is corrected under the control of a reading pulse, which, after the first reading pulse, is supplied to the windings T2 on the cores Z and D. For this purpose, the cores Z and D are connected via a loop-coupling to the core S, the windings W9 and W10 being connected in series via a rectifier G4 to a capacitor C4, which is connected via a resistor R4 to the winding W11 on the core S. The winding sense is so chosen that, when a reading pulse is supplied to the winding T2 on the core Z if this core occupies the condition 1, the winding W11 on the core S receives a correcting pulse such that this winding returns to the condition 0, so that the core S now registers the desired sum. If the cores A1, M1 and C register the figure 1, as corresponds to the case F8 of Fig. 3, the cores S, Z and D are brought into the condition 1 under the control of the first reading pulse. The core S now registers the actual sum of the three numbers and the core Z registers the carry. The reading pulse occurring at the winding T2 on the core Z would restore the core S to the condition 0, but this is prevented, since under the control of the reading pulse in the winding T2, the core D in this case also gives off a reaction pulse which eliminates the correcting pulse at the winding W9. The reading pulse at the winding T2 on the core Z causes the carry produced in the core Z to be transferred via the loop-coupling comprising the windings W12 and W13, rectifier G3, capacitor C3 and resistor R3 to the core C. The figure of the sum produced in the core S is transferred to the core A*n* under the control of the reading pulse which, at the beginning of the subsequent adding stage, is supplied to the winding T1 on the core S via the loop coupling between the core S and the core A*n* comprising rectifier G5, capacitor C5 and resistor R5. At the end of the whole addition, the various figures of the sum are thus registered in the register A.

The condition that the core D is allowed to pass to the condition 1 only if all of the memory elements A1, M1 and C register the figure 1, but must not pass to that condition if only two of the figures are 1, cannot be satisfied in practice with all magnetic materials. This may be improved by supplying a direct current to one of the windings on the core D, which direct current provides a pre-polarization H0 as shown in Fig. 2, so that the range between the values H0 and H2 on the H-axis is larger than that between the origin and H2. The registration of the figures 1 and 0 then corresponds to the points 1′ and 0′ on the hysteresis loop.

The circuit shown in Fig. 4 substantially corresponds to that of Fig. 1, identical elements being indicated by the same reference numerals. The task of the core D in the circuit of Fig. 1, viz. neutralizing the correcting pulse given off by the core Z, is carried out in the circuit of Fig. 4 by the memory device D having cores D1 and D2. The cores A1, M1 and C, as before, are coupled via a loop coupling comprising the windings W3, W4, W5, W6, W7, rectifier G2, capacitor C2 and resistor R2 to the cores S and Z in a manner such that under the control of a first reading pulse at the windings T1 on the cores A1, M1 and C, the core S passes to the condition 1 if at least one of the figures to be added is 1, and the core Z passes to the condition 1 if at least two of these figures are 1. The cores A1 and M1 are also coupled via a loop coupling comprising the windings W3, W4 and W14, rectifier G6, capacitor C6 and resistor R6 to the core D1. The number of turns of the winding W14 is so chosen that the core D1 under the control of a reading pulse passes to the condition 1 only if the two cores A1 and M1 occupy the condition 1. The core C is coupled via the loop coupling comprising the winding W5 and W15, rectifier G7, capacitor C7 and resistor R7 to the core D2, so that the core D2 under the control of the first reading pulse passes to the condition 1 if the figure 1 is registered in the core C. The cores D1 and D2 thus occupy the condition 1 simultaneously only if the three figures to be added are 1. The sum of the figures is produced in the core S in the manner previously described and the carry in the core Z. In the cases F5, F6 and F7 of the table in Fig. 3, a correcting pulse is to be transferred from the core Z to the core S, which correcting pulse is to be eliminated by a pulse of the device D, if the three figures to be added are 1. The number of turns of the winding W9 on the core Z is twice that of the windings W16 and W17 on the cores D1 and D2 and is so chosen that the action of the correcting pulse transferred via the winding W9 to the winding W11 on the core S, is eliminated only if the two cores D1 and D2 occupy the condition 1.

The device may be varied in different ways within the scope of the invention. Thus, for example, it is possible to arrange separate loop couplings between the cores A1, M1 and C on the one hand and the cores S, Z and D or D1 and D2 on the other hand.

What is claimed is:

1. A circuit arrangement for adding two binary numbers, comprising a first group of magnetic cores and a second group of magnetic cores, each of said cores being composed of a magnetic material having a substantially rectangular hysteresis loop, means for storing information in binary form in said first group, means linking all of said cores comprising a first winding on each core, the number of turns of said first windings of the first group being equal, the number of turns of said first windings of the second group being unequal, all of said first windings being connected in series, transfer means for transferring information from said first group to said second group comprising a second winding arranged on each core of said first group, means for applying a first reading pulse at a first predetermined time simultaneously to all of said second windings of said first group, means linking all the cores of said second group comprising a second winding on each core of said second group, said second windings of said second group being connected in series, one of said second windings being wound in a direction opposite from the other, and a third winding on each of the cores of said second group but one, and means for applying a second reading pulse at a second predetermined time simultaneously to said third windings.

2. A circuit arrangement for adding two binary numbers, in which the digits of the sum are produced in sequential stages by adding to the digits of the numbers corresponding to the same binal the carry produced in the preceding stage, comprising a first group of three magnetic cores and a second group of three magnetic cores, each of said cores being composed of a magnetic material having a substantially rectangular hysteresis loop, means for storing digits of the same binal in two of the cores of the first group and the carry from a preceding stage in the third core of the first group, means linking all of said cores comprising a first winding on each core, the number of turns of said first windings of the first group being equal, the number of turns of said first winding on the second core of the second group being one-and-one half times that of the turns of the first winding on the first core, the number of turns of said first winding on the third core of the second group being three times that of the turns of said first winding on the first core, all of said first windings being connected in series, transfer means for transferring information from said first group to said second group comprising a second winding arranged on each core of said first group, means for applying a first reading pulse simultaneously at a first predetermined time to all of said second windings of said first group, means linking all the cores of said second group comprising a second winding on each core of said second group, said second windings of said second group being connected in series, the second windings of the first and third cores being wound oppositely to the second winding of the second core, and a third winding on the second and third cores of the second group, means for applying a second reading pulse at a second predetermined time simultaneously to said third windings, and a fourth winding on said second core of said second group, said fourth winding being in series a third winding on the third core of said first group.

References Cited in the file of this patent

UNITED STATES PATENTS

| | | |
|---|---|---|
| 2,696,347 | Lo | Dec. 7, 1954 |
| 2,781,504 | Canepa | Feb. 12, 1957 |
| 2,819,018 | Yetter | Jan. 7, 1958 |
| 2,852,699 | Ruhman | Sept. 16, 1958 |

OTHER REFERENCES

"Automatic Digital Computers," by Wilkes, published by John Wiley and Sons, June 1956, page 224.